(12) United States Patent
Nekoogar et al.

(10) Patent No.: US 9,355,545 B2
(45) Date of Patent: May 31, 2016

(54) SECURE OPTIONALLY PASSIVE RFID TAG OR SENSOR WITH EXTERNAL POWER SOURCE AND DATA LOGGING

(71) Applicants: Faranak Nekoogar, San Ramon, CA (US); Matthew Reynolds, Seattle, WA (US); Scott Lefton, Melrose, MA (US); Farid Dowla, Castro Valley, CA (US); Richard Twogood, San Diego, CA (US)

(72) Inventors: Faranak Nekoogar, San Ramon, CA (US); Matthew Reynolds, Seattle, WA (US); Scott Lefton, Melrose, MA (US); Farid Dowla, Castro Valley, CA (US); Richard Twogood, San Diego, CA (US)

(73) Assignee: Dirac Solutions, Inc., Pleasanton, CA (US)

( * ) Notice: Subject to any disclaimer, the term of this patent is extended or adjusted under 35 U.S.C. 154(b) by 0 days.

(21) Appl. No.: 14/715,539

(22) Filed: May 18, 2015

(65) Prior Publication Data
US 2015/0339499 A1    Nov. 26, 2015

Related U.S. Application Data

(60) Provisional application No. 62/000,689, filed on May 20, 2014.

(51) Int. Cl.
*H04Q 5/22* (2006.01)
*G08B 21/00* (2006.01)
*G06K 19/07* (2006.01)
*G06K 19/077* (2006.01)
*G06K 7/10* (2006.01)

(52) U.S. Cl.
CPC ............ *G08B 21/00* (2013.01); *G06K 19/0723* (2013.01); *G06K 19/07798* (2013.01); *G06K 2007/10504* (2013.01)

(58) Field of Classification Search
CPC ... G06K 19/0723; G06K 7/0008; G08B 21/00
USPC ........................................................ 340/10.1
See application file for complete search history.

(56) References Cited

U.S. PATENT DOCUMENTS

| | | | |
|---|---|---|---|
| 4,857,893 | A | 8/1989 | Carroll |
| 5,430,441 | A | 7/1995 | Bickley |
| 6,525,648 | B1 | 2/2003 | Kubler |
| 6,734,797 | B2 | 5/2004 | Shanks |
| 6,784,813 | B2 | 8/2004 | Shanks |
| 6,816,063 | B2 | 11/2004 | Kubler |
| 6,956,472 | B1 | 10/2005 | Walcott, Jr. |
| 7,199,716 | B2 | 4/2007 | Shanks |
| 7,212,125 | B2 | 5/2007 | Shanks |
| 7,446,658 | B2 | 11/2008 | Panotopoulos |

(Continued)

OTHER PUBLICATIONS

Melexis MLX90129—This integrated circuit provides a standalone passive sensor transponder capable of being powered via radio energy to input, process and store multiple channels of sensor data. The data sheet PDF is included as an appendix with this report. Note that no patent was found for this device, Jun. 29, 2012.

*Primary Examiner* — Don N Vo

(57) ABSTRACT

A secure optionally passive RFID tag or sensor system comprises a passive RFID tag having means for receiving radio signals from at least one base station and for transmitting radio signals to at least one base station, where the tag is capable of being powered exclusively by received radio energy, and an external power and data logging device having at least one battery and electronic circuitry including a digital memory configured for storing and recalling data. The external power and data logging device has a means for powering the tag, and also has a means.

30 Claims, 8 Drawing Sheets

(56) References Cited

U.S. PATENT DOCUMENTS

| | | |
|---|---|---|
| 7,564,358 B2 | 7/2009 | Shanks |
| 7,928,843 B2 | 4/2011 | Shanks |
| 7,965,189 B2 | 6/2011 | Shanks |
| 8,451,098 B2 | 5/2013 | Posamentier |
| 8,490,881 B2 | 7/2013 | Jalkanen |
| 2005/0174239 A1 | 8/2005 | Shanks |
| 2006/0267772 A1* | 11/2006 | Knadle ............... G06K 7/0004 340/572.4 |
| 2007/0035382 A1 | 2/2007 | Lee |
| 2009/0303013 A1* | 12/2009 | Edgerton ............. G06K 7/0008 340/10.1 |
| 2010/0231407 A1* | 9/2010 | Carr ................... G06K 19/0723 340/691.1 |
| 2011/0187507 A1 | 8/2011 | Nikitin |
| 2012/0256730 A1 | 10/2012 | Scott |
| 2014/0061315 A1 | 3/2014 | Mehring |
| 2015/0276820 A1* | 10/2015 | Floyd, III ................ H02J 13/00 702/62 |

* cited by examiner

SECURE OPTIONALLY PASSIVE RFID TAG OR SENSOR WITH EXTERNAL POWER SOURCE AND DATA LOGGING

RELATED APPLICATIONS

This patent application claims the benefit under 35 USC 119(e) of U.S. Provisional Patent Application No. 62/000,689, filed on May 20, 2014 and entitled "Secure Optionally Passive RFID Tag With External Power Source And Data Logging", the entirety of which is incorporated herein by reference.

The United States Government has rights in this invention pursuant to Contract DE-AC52-07NA27344 between the United States Department of Energy and Lawrence Livermore National Security, LLC, for the operation of Lawrence Livermore National Laboratory.

FIELD OF THE INVENTION

This invention relates to passive RFID tags or sensors used to secure physical objects against tampering, and more particularly, to passive RFID tags or sensors having optional external power sources and data logging for use when passive powering and transmission of data is temporarily unavailable.

DESCRIPTION OF THE RELATED ART

Containers of sensitive, valuable and/or dangerous materials such as radioactive and fissile materials must be securely monitored to verify location and also container condition, including unauthorized opening and seal tampering. The use of RFID tags or sensors to monitor such containers is well known in the art.

RFID tags may be either passive, semi-passive, (also known as battery-assisted passive or BAP, or semi-active) or active. Passive RFID tags have no internal power source but instead harvest energy from received radio signals of an appropriate frequency transmitted by an RFID reader or transceiver, and use that energy to power the tag circuitry. Outgoing signals are generally produced by backscatter modulation which is then detected by the RFID reader or transceiver, and is viewed as a form of signal transmission. Active RFID tags require an internal power source such as a battery, which is used to power the tag circuitry and generate the outgoing signal. Semi-passive RFID tags are similar to passive tags except that a battery is used to power the tag circuitry. The semi-passive tag still communicates by drawing power from the RFID reader or transceiver. The battery allows the tag circuitry to be constantly powered, which removes the need for the antenna to be designed to collect power from the incoming signal. Antennas can therefore be more fully optimized for the backscattering signal. There are a group of semi-passive RFID tags which have a sleep mode in which the battery is off, and use the received radio energy to actuate an electronic switch to turn the battery on. After some unit of time, the battery will again be turned off to conserve battery life. Semi-passive RFID tags are faster in response and therefore stronger in reading ratio compared to passive tags.

RFID tags have been combined with sensors including fiber optic cable loops, temperature sensors radiation sensors, light level sensors, humidity sensors, vibration sensors, chemical sensors, gas sensors, pressure sensors, accelerometers, and gyroscopes. Additionally, RFID tags have the ability to store data collected from sensors.

A passive RFID tag offers the advantage of not requiring any batteries, receiving electrical energy from the radio signals broadcast by one or more RFID readers or transceivers functioning as base stations. These base stations are at a distance from the tag, so that the tag may be used in field conditions. The passive RFID tag uses this energy for operations including to receive incoming data, decrypt and process that data, process data such as sensor inputs, and encrypt and transmit outgoing data. However, there are circumstances where it is impractical to receive or send radio signals but where it is still desirable to acquire and store data such as sensor inputs until data can be transmitted. These circumstances include transporting a container having a passive RFID tag out of base station signal range, moving the container into a location shielded from radio waves, or moving the container into a location where radio signals could have a negative effect, such as in proximity to unexploded ordnance with detonators that are sensitive to electrical potentials. These circumstances are generally seen as being of a duration of two weeks or less, though longer durations can be envisioned.

U.S. Pat. No. 8,490,881 entitled APPARATUSES AND METHODS RELATING TO RADIO FREQUENCY IDENTIFICATION (RFID) TAGS teaches an optionally passive RFID tag with an externally attachable battery. The attachment of the battery also has the option of changing the operational characteristics of the tag. However, no sensors nor external data logging are taught and while a housing is taught, it is not environmentally sealed.

U.S. Pat. No. 8,451,098 entitled Switchable active-passive RFID tag teaches an optionally passive RFID tag with a user-operable switch to engage or disengage a battery for additional transmit range when needed. In some embodiments, connecting the battery may also modify the contents of the data transmitted from the RFID tag. However, no sensors nor external data logging are taught and while a housing is taught, it is a bracelet and not environmentally sealed.

U.S. Pat. No. 6,525,648 entitled Radio frequency identification systems and methods for waking up data storage devices for wireless communication teaches the optional use of a battery to boost transmission range of an otherwise passive RFID tag, transmission of tag data to an external memory device with more data storage capacity than is present on the tag, the use of sensors associated with the tag and the transmission of sensor data to the external memory device, and the transmission of data from the external storage device to the RFID tag. However, the battery is not taught as an overall substitute power source for the tag, nor is the battery taught as being external but directly connected to the tag, nor is the external data logging taught as being directly connected to the tag. There is also no mention of secure data transmission.

U.S. Patent Application No. U.S. 20140061315 entitled RFID TAG WITH REMOTE SENSORS AND/OR REMOVABLE BATTERIES teaches an active RFID tag with a removable external battery, as well as external sensors. Connectors between the tag and the battery and/or sensors are also taught, as is the use of a controller and internal memory. However, the '315 tag does not provide the ability to operate solely upon received radio energy, the sensors are not internal to the tag, and there is no external memory.

The Melexis MLX90129 integrated circuit provides a standalone passive sensor transponder capable of being powered via radio energy to input, process and store multiple channels of sensor data. An optional external battery permits continuous operation without the need to be powered by radio energy. External memory can be added and data stored in external memory can be read back through the integrated circuit and transmitted by RFID. An external microcontroller can be added and powered either by the optional external battery or by the integrated circuit in passive mode. However, the Melexis integrated circuit is designed to be inductively powered, rather than using more advantageous UHF frequencies and far-field electromagnetic propagation. Further, the use of inductive coupling prevents the Melexis integrated circuit from using dual-polarized or circularly polarized antennas. The Melexis integrate circuit also uses amplitude shift keying and load modulation rather than the more advantageous phase shift keyed backscatter modulation, and uses a simple password scheme rather than a more secure AES based authentication scheme. Further, the integrated circuit is merely a circuit element and does not have any protection against the environment.

A secure passive RFID tag or sensor with greater utility would be environmentally rugged and sealed, and would provide a default mode of entirely battery-free operation through received radio signals preferably at UHF frequencies, would provide secure signal reception and transmission, and would also have the capability of being externally powered and having external data logging for temporary circumstances where radio signals were not available.

SUMMARY OF THE INVENTION

A secure optionally passive RFID tag system comprises a passive RFID tag having a first environmentally rugged and sealed housing wherein the tag further comprises means for receiving radio signals from at least one base station and for transmitting radio signals to at least one base station, means for being powered exclusively by received radio energy and for storing data, the system further comprising an external power and data logging device having a second environmentally rugged and sealed housing, at least one battery, electronic circuitry including a digital memory configured for reading, storing and writing data, the external power and data logging device providing means for powering the tag and for reading and storing data from the tag, and a means for reversibly joining the first environmentally sealed housing to the second environmentally sealed housing which maintains an environmental seal for the tag and the external power and data logging device.

Further, the external power and data logging device further comprises means for writing data to the tag, and the tag further comprises means for transmitting data received from the external power and data logging device.

Still further, the tag further comprises means for attachment to an object, where the means for attachment may be an adhesive.

Yet further, the received signals are encrypted and the tag further comprises means for decrypting signals and encrypting signals, and the transmitted signals are encrypted. The means for transmitting radio signals may comprise phase shift keyed backscatter modulation. The signals may be encrypted and decrypted via means including AES based authentication. The means for receiving radio signals from at least one base station and for transmitting radio signals to at least one base station further comprises the use of UHF frequencies and far-field electromagnetic propagation. The tag further comprises an antenna which may be a patch antenna, a linear polarized antenna, a dual-polarized antenna or a circularly polarized antenna. The tag may further comprise at least one sensor selected from the group consisting of fiber optic cable loop, temperature sensor, radiation sensor, light level sensor, humidity sensor, vibration sensor, chemical sensor, gas sensor, pressure sensor, accelerometer, and gyroscope, wherein the data includes data received from the sensor.

Yet still further, the external power and data logging device includes a means for attachment to the tag. The tag includes an electrical connector and the external power and data logging device includes a matching electrical connector, the means for powering the tag at least partially comprises communicating electrical power through the electrical connectors, and the means for reading data from the tag least partially comprises communicating electrical signals through the electrical connectors. Attaching the external power and data logging device to the tag causes the tag to be powered by the battery, and attaching the external power and data logging device to the tag causes the digital memory to be able to read data from the tag. The connectors each have a longitudinal connecting axis, and at least one of the connectors is movably mounted to provide accommodation of positioning errors between the connectors. The movably mounted connector provides planar movement perpendicular to the connecting axis, the movably mounted connector further provides angular movement, and thereby the movably mounted connector is positionally adaptable to the matching connector. The planar movement may provide at least 0.030" of movement, and the angular movement may provide at least 1 degree of movement. The movably mounted connector may further comprise a connector holder configured for attachment to one of the connectors, the connector holder having a flexible region, wherein flexure of the flexible region provides the angular movement, the flexible region being at least partially bounded by a thicker and less flexible border with at least one channel partially enclosing the border, the connector holder being slidable within the channel and thereby the connector holder provides the planar movement perpendicular to the connecting axis. The means for being environmentally sealed together may include a protruding port of generally tubular shape, a captive rotatable cap configured to releasably engage with the port, and a reversibly compressible sealing element configured to seal between the port and the cap.

Additionally further, the tag system may further comprise a means for tamper detection in the tag, and a means for providing alarm data if tampering is detected. The means for tamper detection may further comprise a fiber optic cable loop having a first end, a second end and a loop portion, the first and second ends being affixed within the first housing and the loop portion being external to the first housing, the fiber optic cable loop containing an optical signal propagating from the first end to the second end, and whereby tampering is detected if the optical signal is interrupted or altered. The means for tamper detection may further comprise a means for disabling or destroying the functionality of the tag if tampering is attempted upon the tag. The tag system may further comprise a means for tamper detection in the external power and data logging device, and a means for providing alarm data if tampering is detected. The tag system may further comprise a means for tamper detection in proximity to the connectors, and a means for providing alarm data if tampering is detected.

Additionally still further, the battery is accessible through a battery compartment, the battery compartment further comprises a battery door, the tag includes a means for attachment to an object, and the door is configured to be inaccessible when the tag is attached to an object.

OBJECTS AND FEATURES OF THE INVENTION

It is an object of the present invention to provide a secure RFID tag or sensor capable of operating in either a passive mode while receiving radio signals from a base station, or a battery powered mode with the use of an optional external battery, intended for when radio signals from a base station are unavailable.

It is another object of the present invention to provide a secure RFID tag or sensor with an external data logging capability intended for circumstances where data cannot be transmitted to a base station.

It is yet another object of the present invention to maintain environmental sealing while providing external battery power and data logging.

It is a feature of the present invention to provide a means for connector alignment between the secure RFID tag or sensor and the external battery and data logging device.

It is another feature of the present invention to prevent access to the external battery when the external battery and data logging device is connected to the installed secure RFID tag or sensor.

It is yet another feature of the present invention to provide tamper detection for the connection between the external battery and data logging device.

It is still another feature of the present invention to provide tamper detection for the secure RFID tag or sensor and for the external battery and data logging device.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE PREFERRED EMBODIMENTS

While the majority of the operational time for the secure optionally passive RFID tag is indeed in a passive mode while receiving power from radio waves transmitted by one or more base stations at some distance, it is essential that an external power and data logging device (EPDL) be quickly and easily attached to an installed tag in the field, while maintaining environmental sealing and general mechanical ruggedness. Conversely too, the removal of the EPDL must the accomplished quickly and easily in the field while leaving the once-again passive RFID tag environmentally sealed and rugged.

Figure 1:
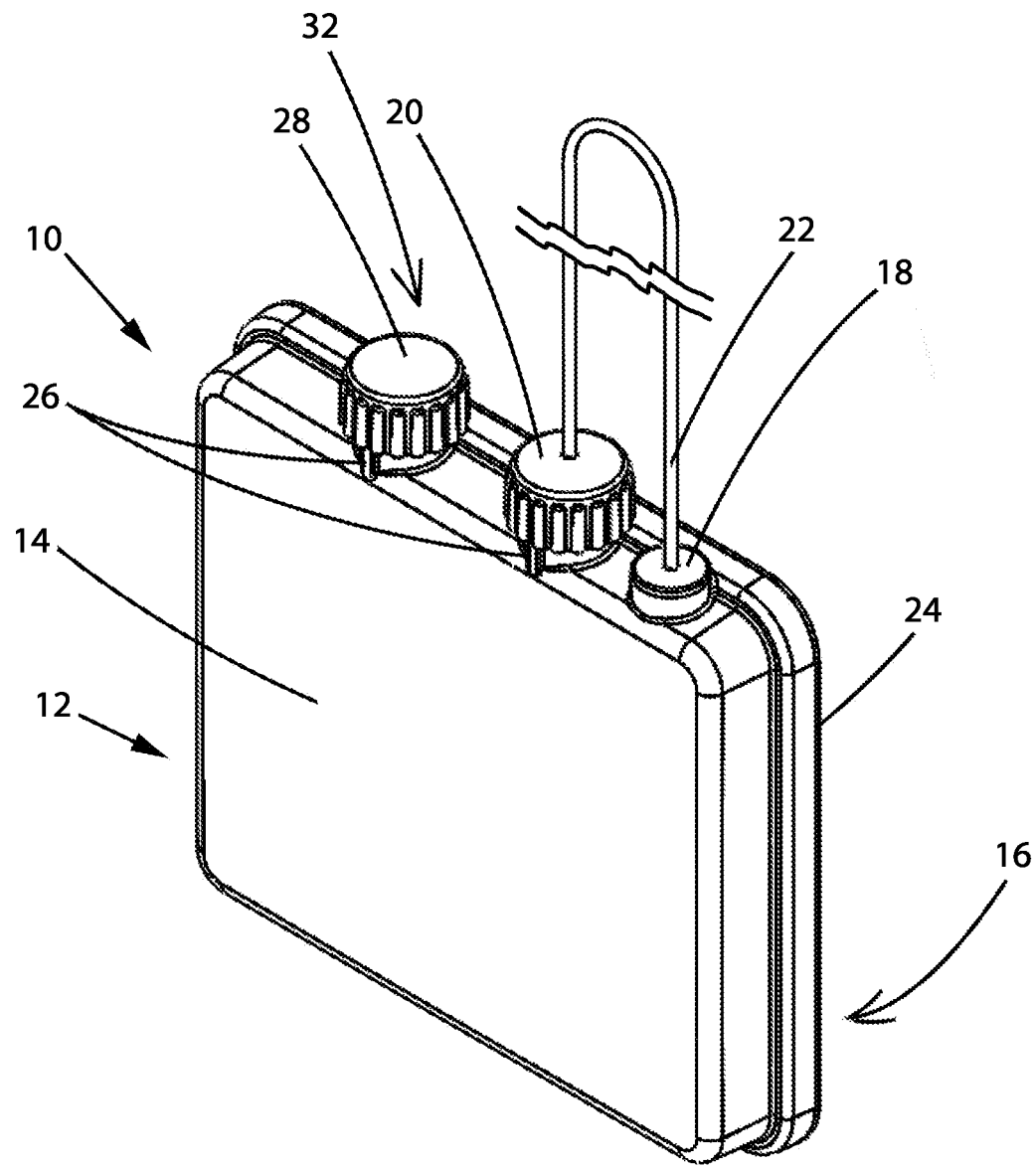
FIG. 1 shows a perspective view of the secure optionally passive RFID tag or sensor.

FIG. 1 shows the optionally passive secure RFID tag 10 of the present invention. The tag 10 is powered exclusively by radio signals received from at least one base station. The received radio signals provide power and also signals which may be data or instructions or both, and the tag 10 transmits signals back to the base station through backscatter modulation, a standard transmission means for passive RFID tags. A preferred means for the tag 10 to receive and transmit radio signals comprises the use of UHF frequencies and far-field electromagnetic propagation, and a preferred modulation scheme comprises phase shift keyed backscatter modulation. The means for the tag 10 to receive and transmit radio signals further comprises at least one antenna which is preferably of a type that may include patch antennas, linear polarized antennas, dual-polarized antennas or circularly polarized antennas. The incoming and outgoing signals are preferably encrypted, and the tag 10 preferably includes means for decrypting and encrypting data. The tag 10 also includes means for storing data. The encryption is preferably a recognized secure encryption such as the Advanced Encryption Standard (AES) cipher-based message authentication. The encryption, decryption and processing of data within the tag 10 is preferably performed by a microcontroller which comprises at least a portion of the tag 10 circuitry. Processing of data may include controlling the reading and writing of data to and from digital memory, and controlling the receiving and transmitting of data.

The tag 10 features an enclosure 12 composed of an enclosure top 14 and an enclosure base 16. The top 14 is preferably made from a durable and radio-transparent polymer such as polycarbonate, which can easily be injection molded. The base 16 is preferably made from a lightweight metal such as an aluminum alloy. The top 14 and base 16 are preferably joined together with a high-performance adhesive such as an epoxy, acrylic or urethane adhesive in order to provide an environmentally rugged and sealed enclosure 12. The base 16 also is preferably at least partially coated with an adhesive 24 such as a very high bond (VHB) tape for attaching the tag 10 to an object or a surface such as a portion of a container. However, while VHB tape is a preferred means for attachment, it is within the scope of the present invention to use any combination of mechanical clamps and fasteners, as well as adhesives, as a means for attachment. The tag 10 as shown also includes a fiber optic cable loop 22 which may be fastened to, around or through portions of a container lid and/or through a locking hasp in order to monitor the closure of the container, wherein if the cable 22 is tampered with or broken, particularly during unauthorized attempts to open the container, the cable 22 tampering will be detected and an alarm condition can be logged or transmitted. The cable 22 carries an optical signal from an optical transmitter within the tag 10 to an optical receiver within the tag 10. In addition to the fiber optic cable, other sensors which may be employed within the tag 10 include temperature sensors, radiation sensors, light level sensors, humidity sensors, vibration sensors, chemical sensors, gas sensors, pressure sensors, accelerometers, and gyroscopes. Preferably the tag 10 also has means for processing and storing data collected from sensors.

The cable 22 emerges from a sealed transmission port cap 18 and returns into a receiving port cap 20, which is configured with a threaded connection and a compression gasket (not shown) to environmentally seal the entry point for installation and service in the field. In use, the receiving port cap 20 is tightened until it stops against a cap stop 26 designed to provide the correct level of tightening. A sealing cap 28 covers a connector port 32 which is designed for use with external power and data logging devices. The sealing cap 28 provides environmental sealing and physical protection to the connector port 32, and also has a cap stop 26 on the enclosure 12. In cases where the cable 22 is not used, a second sealing cap 28 may cover the receiving port too.

Figure 2:
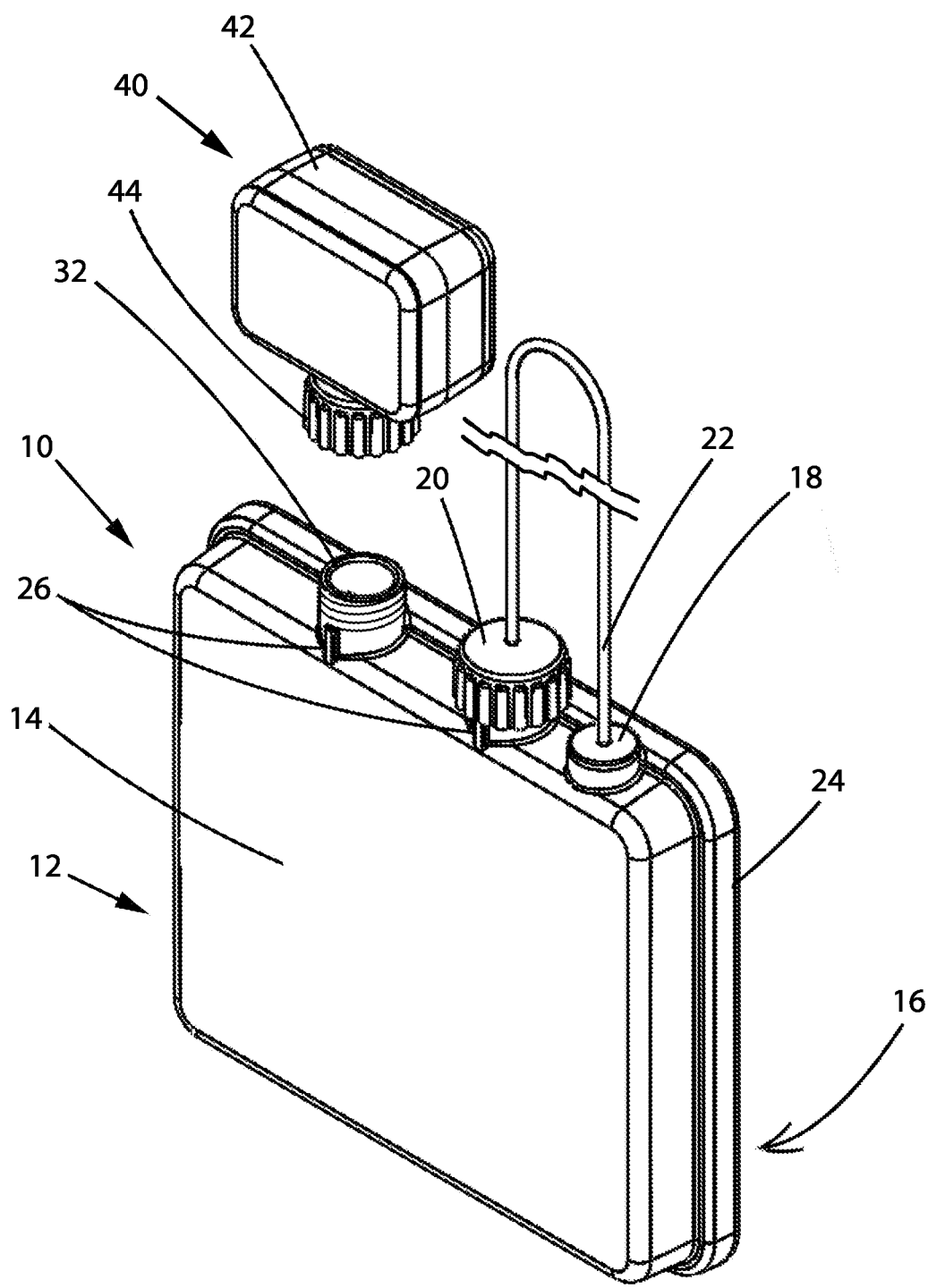
FIG. 2 shows an perspective view of the secure optionally passive RFID tag or sensor and the external power and data logging device.
Figure 3:
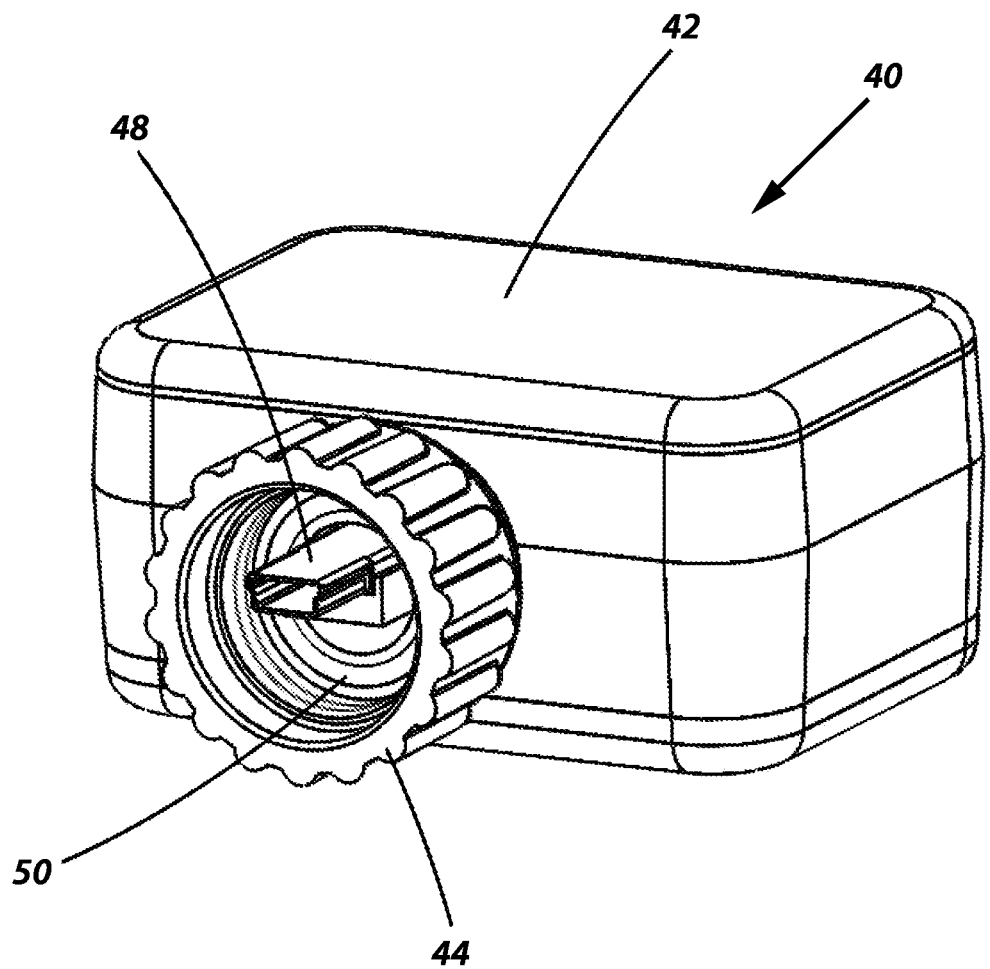
FIG. 3 shows a perspective view of the external power and data logging device.

FIG. 2 shows the tag 10 and the external power and data logging device 40 (EPDL). The preferred form of the EPDL 40 is an environmentally rugged and sealed enclosure 42 that fastens to the connector port 32 with a captive rotating cap 44. The enclosure 42 is preferably made from a durable and radio-transparent polymer such as polycarbonate, which can easily be injection molded. Portions of the EPDL enclosure 42 may preferably be joined together with a high-performance adhesive such as an epoxy, acrylic or urethane adhesive in order to provide an environmentally rugged and sealed enclosure 42. For portions of the enclosure 42 that may require opening or attaching to other devices, seals such as O-rings and elastomer gaskets are preferably employed to maintain reusable sealing. Fasteners such as screws and captive threaded hardware may be used in conjunction with the seals. The EPDL enclosure 42 contains at least one battery, and electronic circuitry including data logging circuitry, with both battery and circuitry electrically connected to the EPDL connector 48. The data logging circuitry at least partially comprises digital memory and is capable of reading data into memory from the tag 10 and particularly sensors in the tag 10, storing data in memory, and of writing data from memory to the tag 10 for purposes of wireless transmission to one or more base stations. The preferred battery for the EPDL is an AA sized, extended temperature range 3.6V battery such as the Tadiran TLH-5903/P. FIG. 3 shows the EPDL connector 46, which is preferably a male mini USB connector. The O-ring 50 inside the captive rotating cap 44 seals against the port 32 when the EPDL 40 and the tag 10 are connected.

Figure 4:
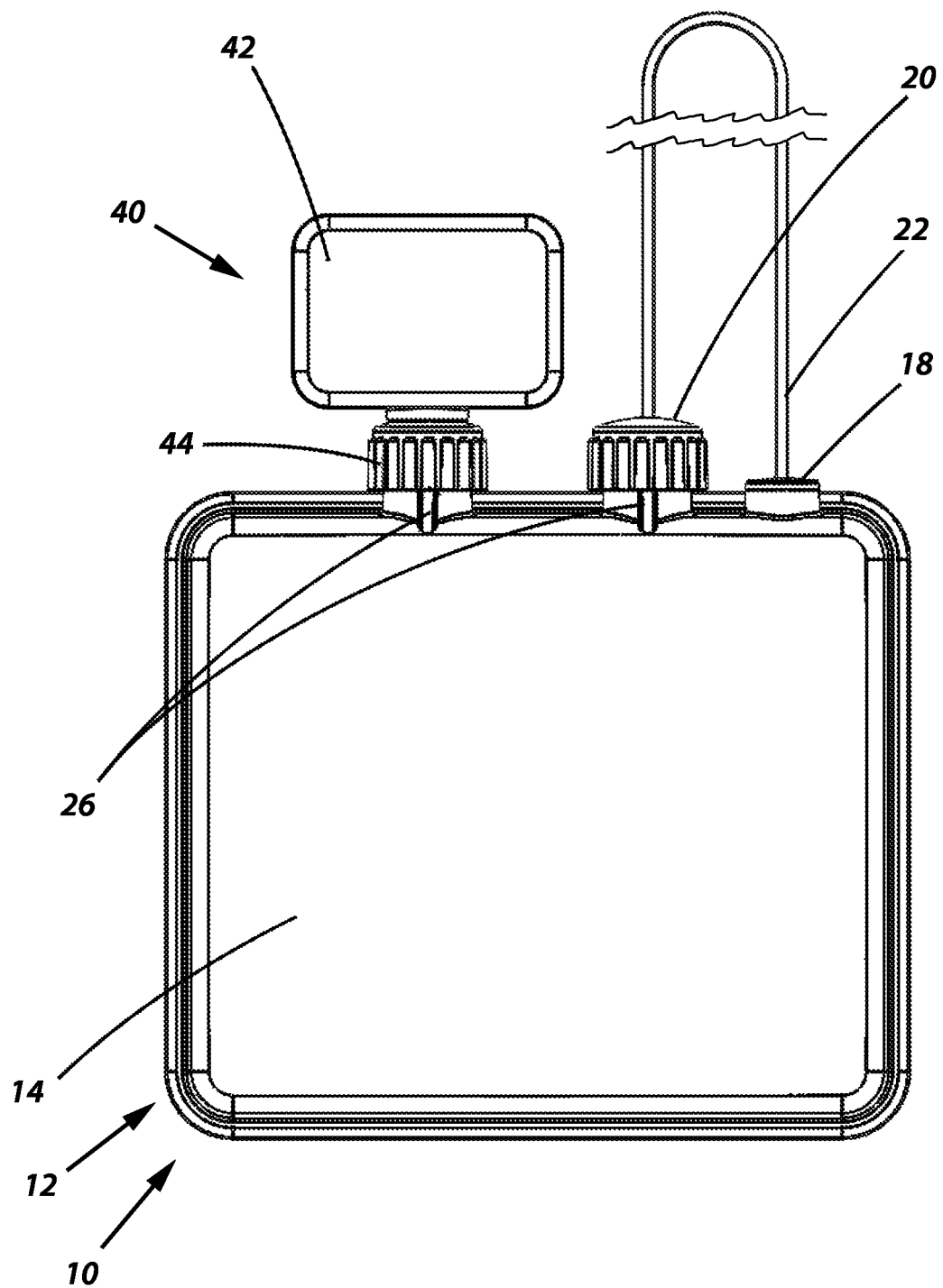
FIG. 4 shows a front plan view of the secure optionally passive RFID tag or sensor and the external power and data logging device joined together.
Figure 5:
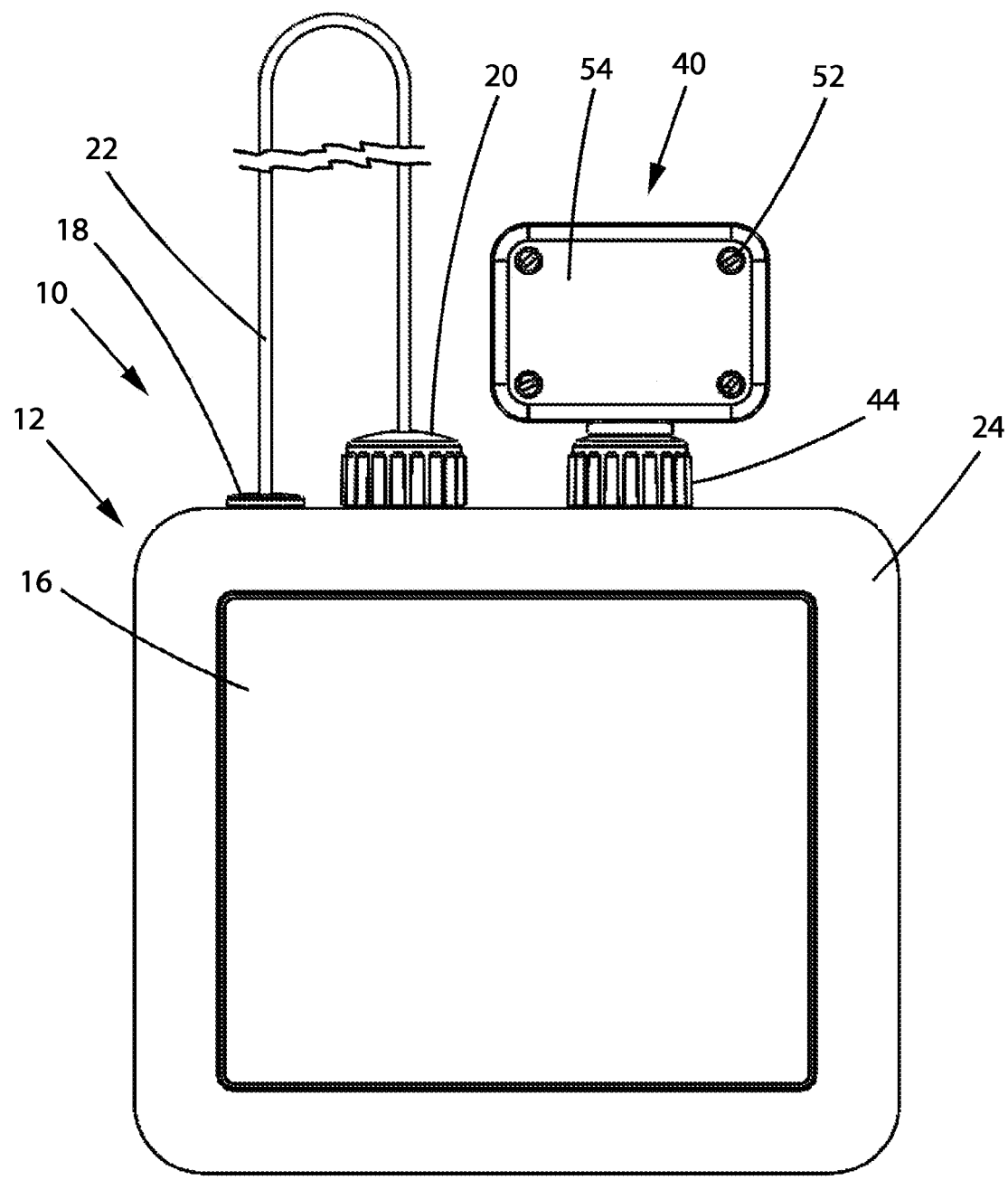
FIG. 5 shows a rear plan view of the secure optionally passive RFID tag or sensor and the external power and data logging device joined together.

FIG. 4 and FIG. 5 show the EPDL 40 joined with the tag 10. The ring of VHB adhesive tape 24 can be seen bordering the base 16 of the tag 10. A battery door 54 secured with battery door screws 52 is seen on the bottom face of the EPDL 40. When the tag 10 is attached to a surface and the EPDL 40 is fastened to the tag 10, the battery door 54 is thus oriented against the surface and is made inaccessible, preventing tampering through removal of the battery door screws 52 and the battery door 54. A small gap, preferably about 0.5 mm, is left between the battery door 54 and the surface to allow for tolerances.

Figure 6:
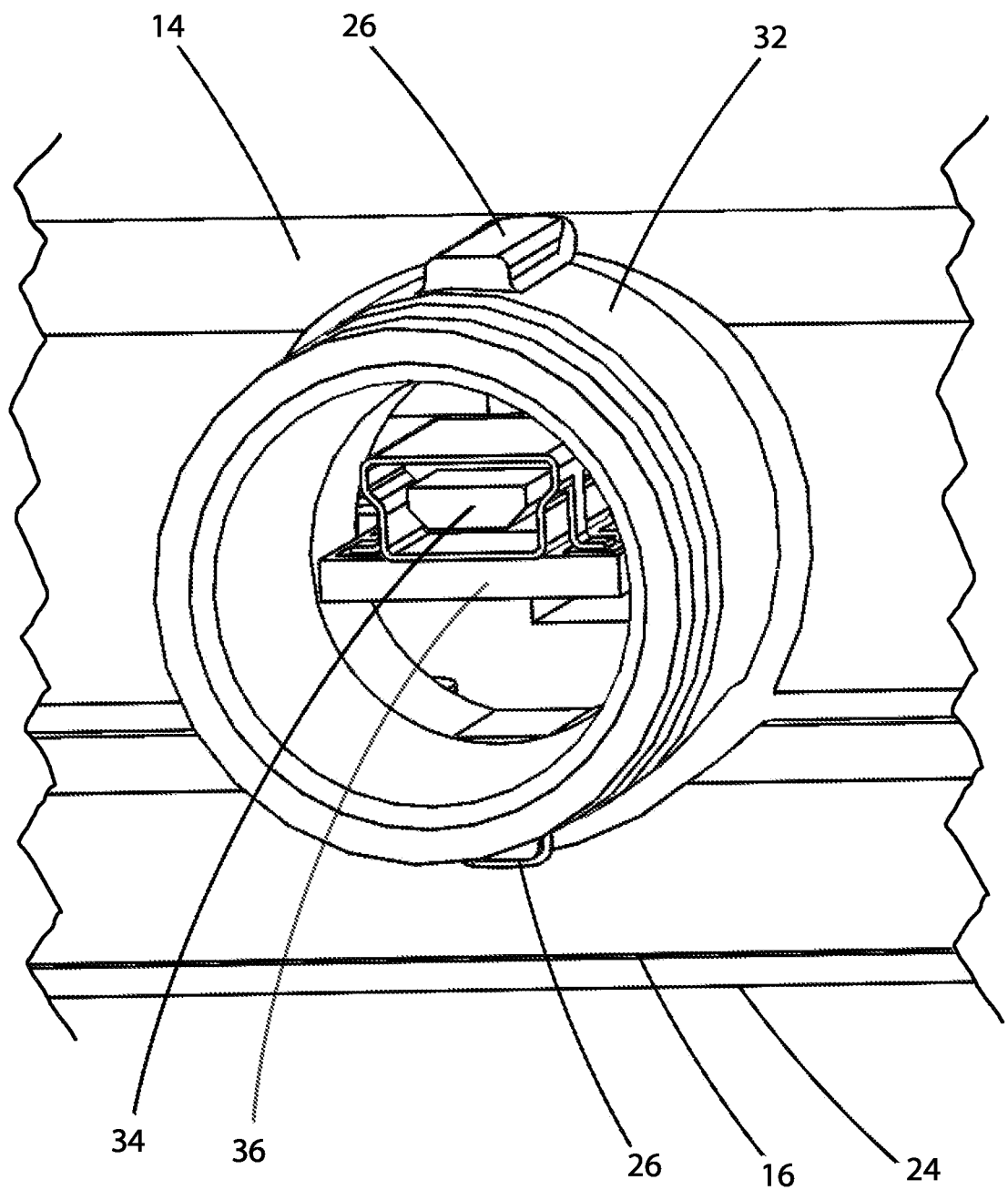
FIG. 6 shows a perspective view of the tag connector.

The EPDL connector 46 mates with a matching tag connector 34 shown in FIG. 6 within the port 32 of the tag 10. The tag connector 34 is preferably mounted on a tag connector pc board 36. Attachment of the EPDL 40 to the tag 10 must provide power, data transmission, environmental sealing and a mechanically robust joint. It is preferred to have a single connector pair provide the electrical communication of power and data. The majority of the tag enclosure 12 is preferably made from a radio-transparent polymer such as polycarbonate, which can be injection molded and which has proven durability and in particular, impact resistance over a sufficiently wide temperature range. Likewise, the enclosure 42 body of the EPDL 40 is preferably made from polycarbonate. Power and data transmission can be realized with standard types of electrical connectors, such as USB jacks and plugs. USB connectors are one preferred format for simple transmission of both power and data, and are readily available in a variety of small form factors. In particular, the mini USB format is preferred for the male and female connectors used in the present invention. The EPDL connector 46 as shown in the present invention is male, and the tag connector 34 as shown in the present invention is female, but it is within the scope of the present invention for the genders of the connector to be swapped, or for different connector series to be used, or for separate connectors to be used for power and data as long as the connectors provide transmission of both power and data. Each connector can be seen to have a longitudinal axis, which is a central axis in the direction of the connecting and disconnecting travel for the connector.

Figure 7:
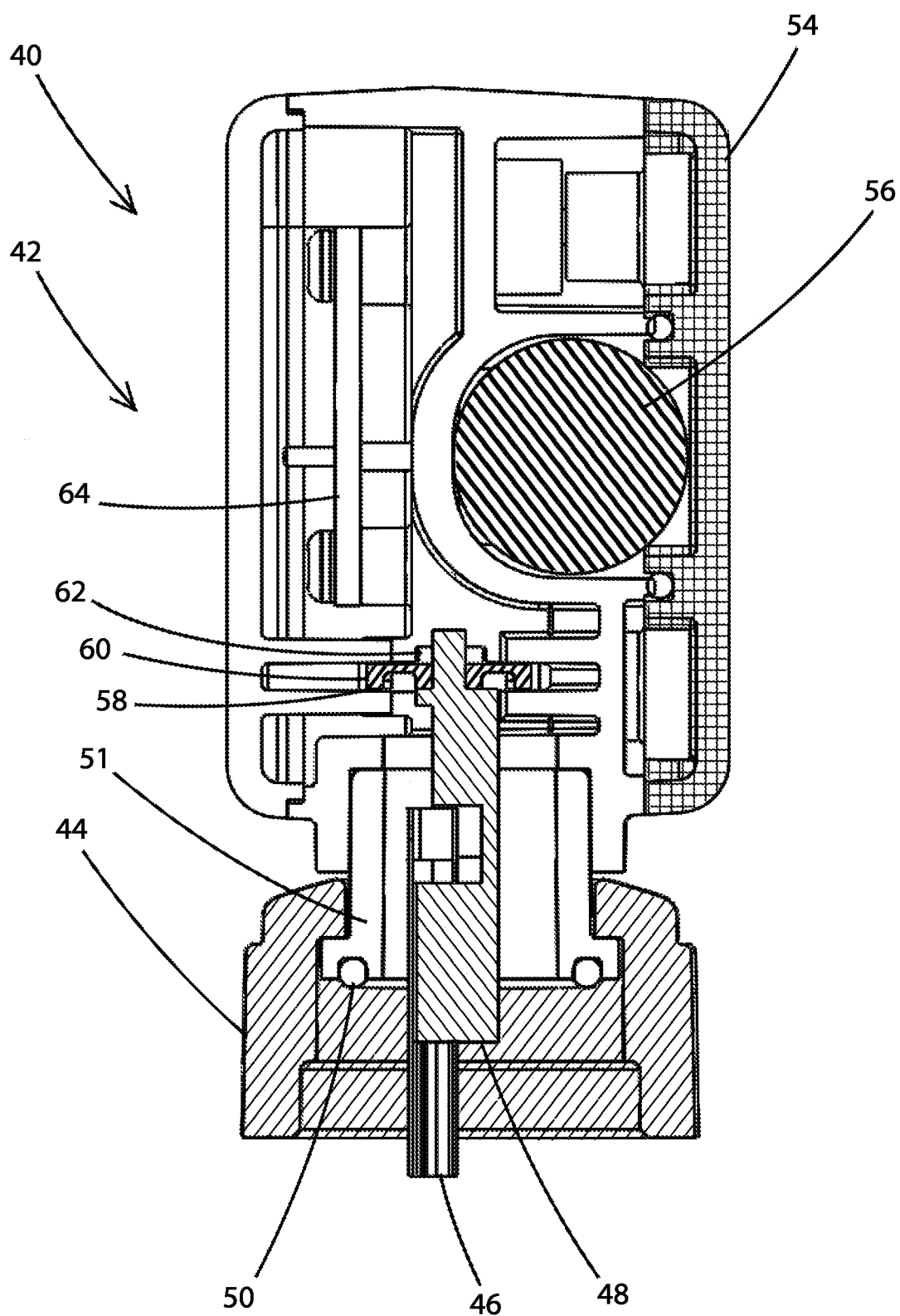
FIG. 7 shows a section view of the external power and data logging device.

Environmental sealing between the tag 10 and the EPDL 40 is essential and is preferably be accomplished with an elastic sealing element such as an O-ring or a gasket. A threaded, detented, cam-locking, or other mechanical connection is desired as a means for attachment between the tag 10 and the EPDL 40 such that uniform compressive pressure is exerted against the sealing element to facilitate environmental sealing. A preferred means of exerting uniform compressive pressure against the sealing element is to have an externally threaded collar on one body and a captive and rotatable internally threaded cap on the other body, with the sealing element positioned between the two bodies. An O-ring 50 is contained as a sealing element within the captive rotating cap 44, although this sealing element can be disposed on either the tag 10 or the EPDL 40 portion of the assembly. FIG. 7 shows the O-ring 50 held in the end of a bushing 51 which serves to rotatably secure the captive cap 44 to the EPDL enclosure 42. While it is preferred for the means of rotatably securing the cap 44 to be permanent, it is within the scope of the present invention to use any means which will reliably provide releasable connection between the EPDL enclosure 42, the cap 44, and the tag enclosure top 14 while environmentally sealing the tag 10 to the EPDL 40.

The incorporation of a mechanical stop 26 for the cap 44 permits control over the degree of seal compression. The externally threaded connector port 32 provides access to one half of the connector pair, herein recessed for mechanical protection and to facilitate the attachment of the sealing cap 28 when the EPDL 40 is not in use, while the other half of the connector pair is located within the rotatable threaded cap 44. The EPDL connector 46 may protrude from the EPDL 40 since this protrusion is not during a use condition, and the mated connectors will be enclosed and environmentally sealed between the tag 10 and the EPDL 40 when in use. It is within the scope of the present invention to have a removable protective cap (not shown) to cover the EPDL connector 46 for environmental sealing and physical protection during storage and transport. The sealing cap 28 will preferably incorporate a sealing element (not shown) similar or identical to the O-ring 50 to seal the connector port 32 when the tag 10 is being used in the regular passive mode.

The process for joining the EPDL 40 to the tag 10 is to remove the sealing cap 28 from the tag 10, and then to mate the EPDL connector 46 with the tag connector 34 inside the port 32. The captive threaded cap 44 has threaded engagement starting with the port 32, and the cap 44 is turned to further engage the port 32 until the cap 44 reaches the cap stop 26. Here the tag 10 and the EPDL 40 are fully connected and environmentally sealed together. The entire process is reversed to separate the EPDL 40 from the tag 10. The tag 10 and the EPDL 40 are configured to fit together closely to maximize mechanical robustness. Anti-rotation features may be included in the connection between the tag 10 and the EPDL 40.

While the USB connector provides a convenient means to connect two power and two data lines in a small and readily available format, the standard method of use for the USB connectors is to have one fixed in a device and the other in a cable end, which provides simple and easy alignment. In the present invention, each USB connector is fixed in a device. Given the space constraints for mounting the tag connector 34 in the tag 10, the tag connector pc board 36 and tag connector 34 are electrically and mechanically joined with surface mount solder pads and small alignment pin/hole pairs, respectively. In order to realize the insertion of the EPDL connector 46 into the port 32 to mate with the recessed tag connector 34, while allowing the port 32 to be sealable with the sealing cap 28 when not in use, the EPDL connector 46 is preferably a cable type connector of elongated format. This elongated format cable type EPDL connector 46 requires a cable to provide electrical communication to the EPDL pc board 64.

Figure 8:
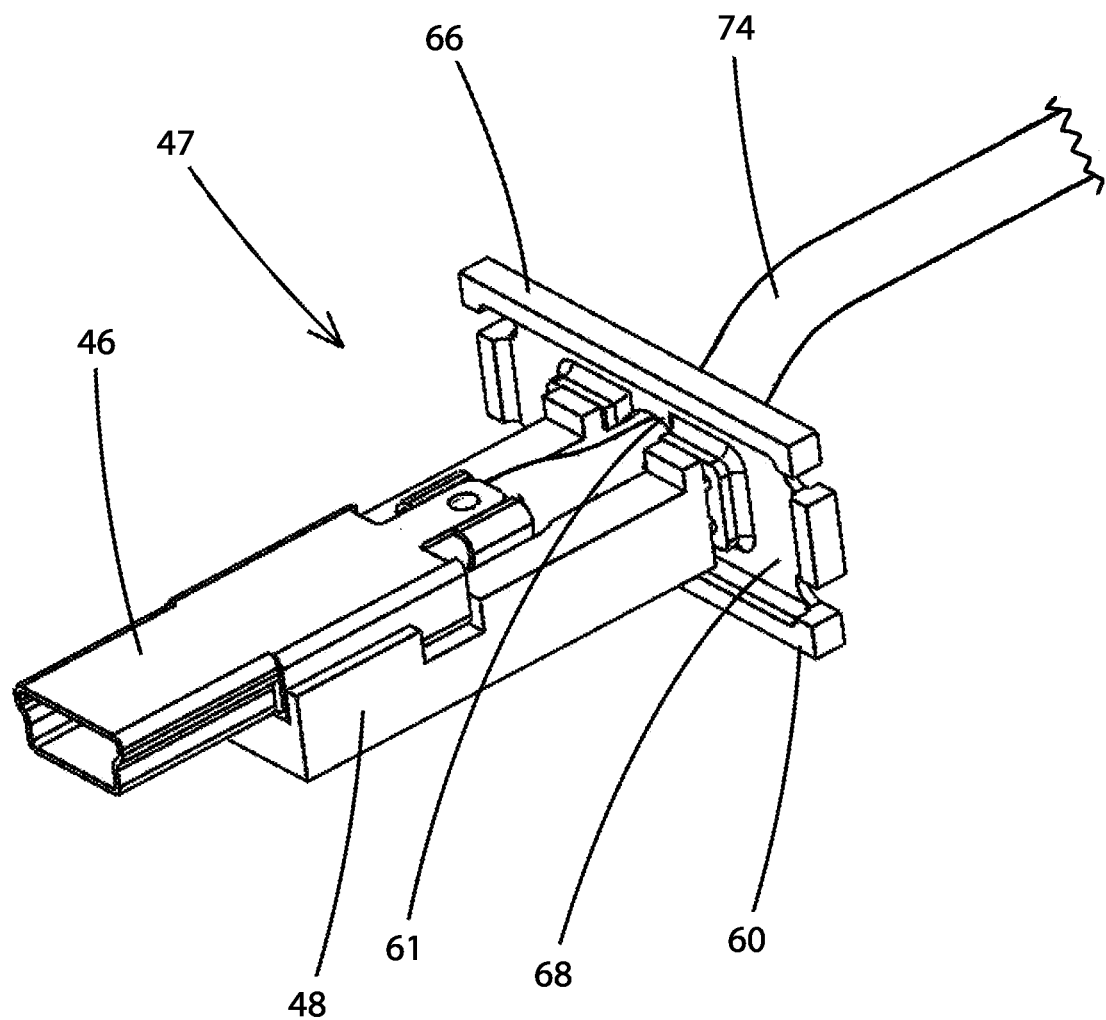
FIG. 8 shows a perspective view of the external power and data logging device connector and the connector holder.

This group of connector requirements and constraints is satisfied at the expense of increased risk of incremental misalignment and consequent positioning errors in the connectors. As each connector can be seen to have a longitudinally oriented central connector axis, the positioning errors include parallel and angular misalignment between the connector axes. Such positioning errors create the risk of the connectors not mating, or mating with lateral or other mechanical positional stresses which could result in failure of surface mount solder connections. Preferably, at least one of the two connectors is mounted with a means for accommodating positioning errors. FIG. 8 shows a connector holder 47, wherein the EPDL connector 46 is fastened into a connector tray 48. The preferred means of fastening the EPDL connector 46 into the connector tray 48 is soldering, though adhesives or any other reliable means of fastening may be employed. Soldering is preferred if the connector tray 48 is made of a readily solderable metal such as brass, while adhesives are preferred in all other circumstances. The connector tray 48 is attached to a transversely oriented flexible wall 60 preferably by pins 62 which use the rear portions of the connector tray 48 with at least one slot in the flexible wall 60 to create a pinned mortise and tenon joint. It is within the scope of the present invention to use any mechanical fastening means which will transversely join the flexible wall 60 to the connector tray 48, or even directly to the EPDL connector 46. The flexible wall 60 preferably comprises a flexible section 68 which has at least a partial perimeter enclosure of a thicker and more rigid border section 66. The flexible wall 60 preferably further comprises an aperture 61 for the cable 70 to pass therethrough. The flexible wall 60 is housed inside the EBDL enclosure 42 by at least one channel 58, wherein the channel 58 is dimensioned to permit a controlled degree of sliding planar movement by the flexible wall 60, substantially perpendicular to the connector axis. When the EPDL connector experiences lateral and angular forces from misalignment during connector mating and captive cap 44 attachment, these forces cause the flexible wall 60 to slide within the channel 58, and to deform the flexible section 68 of the flexible wall 60 with a resultant angular displacement, thereby permitting full and low-stress mating of the connectors. Having separated portions of the border section 66 permits easier flexure of the flexible section 60, while still permitting the border section 66 to slide within the channel 58. Preferably, there is allowed at least 0.030" of planar movement and at least 1° of angular movement.

Attaching the EPDL 40 to the tag 10 preferably causes circuitry in the EPDL 40 to power the tag 10 through the battery 56 and read any data present in the tag 10 into the EPDL 40 memory. This logged data may be sensor data, alarm conditions, or any other data produced or stored within the tag 10. In the circumstance where base station radio contact is renewed or continuing to be present and the EPDL 40 is attached to the tag 10, the tag 10 may cause the EPDL 40 to write logged data back to the tag 10, wherein the tag 10 then can transmit this data via typical RFID radio means to the base station.

For the tag 10 and the EPDL to be secure devices, it is preferable that each have means for tamper detection. Means for tamper detection are well known in the art, and may include reversibly or irreversibly opening or shorting circuits, interrupting or altering optical signal paths, or any other means which will result in an electrically detectable change in condition. A preferred means for tamper detection in the tag 10 comprises the fiber optic cable loop 22. Another preferred means for tamper detection in the tag 10 includes a trigger mechanism built into the tag base 16 wherein attempts to remove the tag 10 from a surface will result in mechanically driven damage or destruction to at least a portion of the tag's electronics, thereby rendering the tag 10 nonfunctional. Appropriate means for tamper detection in the EPDL 40 may include but is not limited to detecting unauthorized opening of the battery compartment. Additionally, it is preferable that the connection between the tag 10 and the EPDL 40 have a means for tamper detection to alert if the connection is broken or interfered with in an unauthorized manner. All such means for tamper detection preferably include a means for providing alarm data if tampering is detected.

Alternate embodiments of the present invention include means for recharging the EPDL 40 batteries, including having an environmentally sealed charger port or wirelessly recharging the batteries.

Additional alternate embodiments of the present invention include having at least one flexible cable joining the EPDL 40 to the tag 10 via at least one environmentally sealed connector pair.

Still additional alternate embodiments of the present invention include having a wireless transmission means in addition to the backscatter modulation employed by passive RFID devices. Such a wireless transmission means could comprise any radio transmission means known in the art, and including a suitably matched antenna, housed within the EPDL 40 and powered by the battery 56.

In the above description of the secure optionally passive RFID tag or sensor of this invention, various configurations are described and applications thereof in corresponding systems are provided. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A secure optionally passive RFID tag system comprising:
   a passive RFID tag having a first environmentally rugged and sealed housing;
      said tag further comprising means for receiving radio signals from at least one base station and for transmitting radio signals to at least one base station;
      said tag further comprising means for being powered exclusively by received radio energy;
      said tag further comprising means for storing data;
   an external power and data logging device having a second environmentally rugged and sealed housing;
      said external power and data logging device further comprising at least one battery;
      said external power and data logging device further comprising electronic circuitry including a digital memory configured for reading, storing and writing data;
      said external power and data logging device providing means for powering said tag;
      said external power and data logging device providing means for reading and storing data from said tag; and
   a means for reversibly joining said first environmentally sealed housing to said second environmentally sealed housing which maintains an environmental seal for said tag and said external power and data logging device.

2. The secure optionally passive RFID tag system of claim 1, wherein:
said external power and data logging device further comprises means for writing data to said tag; and
said tag further comprises means for transmitting data received from said external power and data logging device.

3. The secure passive RFID tag system of claim 1, wherein said tag includes a means for attachment to an object.

4. The secure passive RFID tag system of claim 3, wherein said means for attachment is an adhesive.

5. The secure optionally passive RFID tag system of claim 1, wherein:
said received signals are encrypted;
said tag further comprises means for decrypting signals and encrypting signals; and
said transmitted signals are encrypted.

6. The secure optionally passive RFID tag system of claim 5, wherein said signals are encrypted and decrypted via means including AES based authentication.

7. The secure optionally passive RFID tag system of claim 1, wherein said tag further comprises at least one sensor selected from the group consisting of fiber optic cable loop, temperature sensor, radiation sensor, light level sensor, humidity sensor, vibration sensor, chemical sensor, gas sensor, pressure sensor, accelerometer, and gyroscope; and
wherein said data includes data received from said sensor.

8. The secure optionally passive RFID tag system of claim 1, wherein:
said tag further comprises an electrical connector;
said external power and data logging device further comprises a matching electrical connector;
said means for powering said tag at least partially comprises communicating electrical power through said electrical connectors; and
said means for reading data from said tag at least partially comprises communicating data through said electrical connectors.

9. The secure passive RFID tag system of claim 8, wherein:
attaching said external power and data logging device to said tag causes said tag to be powered by said battery; and
attaching said external power and data logging device to said tag causes said digital memory to read and store data from said tag.

10. The secure optionally passive RFID tag system of claim 9, wherein:
if signals are received from at least one base station, said tag may cause said external power and data logging device to write stored data back to said tag, whereby said tag may then transmit said data to the base station.

11. The secure optionally passive RFID tag system of claim 8, wherein:
said connectors each have a longitudinally oriented connecting axis; and
at least one of said connectors is movably mounted to provide accommodation of positioning errors between said connectors.

12. The secure optionally passive RFID tag system of claim 9, wherein said movably mounted connector provides substantially planar movement perpendicular to said connecting axis;
said movably mounted connector further provides angular movement; and
thereby said movably mounted connector is positionally adaptable to said matching connector.

13. The secure optionally passive RFID tag system of claim 12, wherein said planar movement provides at least 0.030" of movement; and
said angular movement provides at least 1 degree of movement.

14. The secure optionally passive RFID tag system of claim 12, said movably mounted connector further comprising:
a connector holder configured for attachment to one of said connectors;
said connector holder having a flexible region, wherein flexure of said flexible region provides said angular movement;
said flexible region being at least partially bounded by a thicker and less flexible border;
at least one channel partially enclosing said border;
said border being slidable within said channel; and
thereby said connector holder being slidable within said channel provides said planar movement perpendicular to said connecting axis.

15. The secure optionally passive RFID tag system of claim 8, further comprising;
a means for tamper detection in proximity to said connectors; and
a means for providing alarm data if tampering is detected.

16. The secure optionally passive RFID tag system of claim 8, wherein said connectors are USB format connectors.

17. The secure optionally passive RFID tag system of claim 1, wherein said means for being environmentally sealed together includes a protruding port of generally tubular shape, a captive rotatable cap configured to releasably engage with said port, and a reversibly compressible sealing element configured to seal between said port and said cap.

18. The secure optionally passive RFID tag system of claim 1, further comprising:
a means for tamper detection in said tag; and
a means for providing alarm data if tampering is detected.

19. The secure optionally passive RFID tag system of claim 18, wherein said means for tamper detection further comprises a fiber optic cable loop having a first end, a second end and a loop portion;
said first and second ends being affixed within said first housing;
said loop portion being external to said first housing;
said fiber optic cable loop containing an optical signal propagating from said first end to said second end; and
whereby tampering is detected if said optical signal is interrupted or altered.

20. The secure optionally passive RFID tag system of claim 18, wherein said means for tamper detection further comprises a means for disabling or destroying the functionality of said tag if tampering is attempted upon said tag.

21. The secure optionally passive RFID tag system of claim 1, further comprising:
a means for tamper detection in said external power and data logging device; and
a means for providing alarm data if tampering is detected.

22. The secure optionally passive RFID tag system of claim 1, wherein said battery is accessible through a battery compartment;
said battery compartment further comprising a battery door;
said tag including a means for attachment to an object; and
said door being configured to be inaccessible when said tag is attached to an object.

23. The secure optionally passive RFID tag system of claim 1, wherein said battery is rechargeable through means selected from the group consisting of having an environmentally sealed charger port or wirelessly recharging the batteries.

24. The secure optionally passive RFID tag system of claim 1, wherein said means for powering said tag and said means for reading data from said tag comprise at least one flexible cable joining said external power and data logging device and said tag via at least one environmentally sealed connector pair.

25. The secure optionally passive RFID tag system of claim 1, wherein said external power and data logging device further comprises a means for active wireless transmission of data.

26. The secure optionally passive RFID tag system of claim 1, wherein said means for receiving radio signals from at least one base station and for transmitting radio signals to at least one base station further comprises the use of UHF frequencies and far-field electromagnetic propagation.

27. The secure optionally passive RFID tag system of claim 1, wherein said tag further comprises an antenna; and
said antenna is selected from the group consisting of patch antennas, linear polarized antennas, dual-polarized antennas and circularly polarized antennas.

28. The secure optionally passive RFID tag system of claim 1, wherein said means for transmitting radio signals comprises phase shift keyed backscatter modulation.

29. A secure optionally passive RFID tag or sensor system comprising:
a passive RFID tag having a first environmentally rugged and sealed housing;
said housing further comprising means for adhesively attaching to an object;
said housing further comprising tamper detection means;
said tag further comprising means for receiving radio signals from at least one base station and for transmitting radio signals to at least one base station;
said tag further comprising means for decrypting signals and encrypting signals;
said received signals and said transmitted signals being encrypted;
said tag further comprising means for being powered exclusively by received radio energy;
said tag further comprising means for storing data;
said tag further comprising at least one sensor selected from the group consisting of fiber optic cable loop, temperature sensor, radiation sensor, light level sensor, humidity sensor, vibration sensor, chemical sensor, gas sensor, pressure sensor, accelerometer, and gyroscope;
wherein said data includes data received from said sensor;
an external power and data logging device having a second environmentally rugged and sealed housing;
said external power and data logging device further comprising at least one battery;
said external power and data logging device further comprising electronic circuitry including a digital memory configured for reading, storing and writing data;
said external power and data logging device providing means for powering said tag;
said external power and data logging device providing means for reading and storing data from said tag;
a means for reversibly joining said first environmentally sealed housing to said second environmentally sealed housing which maintains an environmental seal for said tag and said external power and data logging device;
said tag further comprising an electrical connector;
said external power and data logging device further comprising a matching electrical connector;
said means for powering said tag at least partially comprising communicating electrical power through said electrical connectors;
said means for reading data from said tag at least partially comprising communicating data through said electrical connectors;
wherein attaching said external power and data logging device to said tag causes said tag to be powered by said battery; and
attaching said external power and data logging device to said tag causes said digital memory to read and store data from said tag.

30. The secure optionally passive RFID tag or sensor system of claim 29, wherein:
said external power and data logging device includes a means for writing data to said tag; and
said tag having means for transmitting data received from said external power and data logging device.

* * * * *